US008838687B2

(12) United States Patent
Niemoeller et al.

(10) Patent No.: US 8,838,687 B2
(45) Date of Patent: Sep. 16, 2014

(54) COMPOSITE SERVICES PROVISION WITHIN A TELECOMMUNICATIONS NETWORK

(75) Inventors: Joerg Niemoeller, Herzogenrath (DE); Ioannis Fikouras, Solna (SE); Konstantinos Vandikas, Aachen (DE); Roman Levenshteyn, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 230 days.

(21) Appl. No.: 12/993,366

(22) PCT Filed: May 20, 2008

(86) PCT No.: PCT/EP2008/056182
§ 371 (c)(1),
(2), (4) Date: Feb. 14, 2011

(87) PCT Pub. No.: WO2009/141000
PCT Pub. Date: Nov. 26, 2009

(65) Prior Publication Data
US 2011/0131277 A1    Jun. 2, 2011

(51) Int. Cl.
| | |
|---|---|
| G06F 15/16 | (2006.01) |
| H04M 15/00 | (2006.01) |
| H04M 3/22 | (2006.01) |
| H04M 3/42 | (2006.01) |
| H04L 29/08 | (2006.01) |
| H04L 12/24 | (2006.01) |
| H04L 29/06 | (2006.01) |

(52) U.S. Cl.
CPC ....... *H04L 41/5051* (2013.01); *H04M 15/8044* (2013.01); *H04M 15/00* (2013.01); *H04M 3/2254* (2013.01); *H04M 2215/7471* (2013.01); *H04M 2215/44* (2013.01); *H04M 2215/0164* (2013.01); *H04M 15/55* (2013.01); *H04M 3/42144* (2013.01); *H04M 15/41* (2013.01); *H04M 3/42127* (2013.01); *H04M 2215/745* (2013.01); *H04M 15/8061* (2013.01); *H04L 65/1096* (2013.01); *H04L 67/10* (2013.01); *H04M 15/59* (2013.01)
USPC .............................. 709/204; 705/52; 709/203

(58) Field of Classification Search
None
See application file for complete search history.

(56) References Cited

U.S. PATENT DOCUMENTS

| | | | | |
|---|---|---|---|---|
| 6,321,250 | B1 * | 11/2001 | Knape et al. .................. | 709/203 |
| 7,000,100 | B2 * | 2/2006 | Lacombe et al. ................ | 713/1 |
| 7,149,793 | B2 * | 12/2006 | Eriksson et al. ............. | 709/220 |
| 7,454,496 | B2 * | 11/2008 | Kundu .......................... | 709/224 |
| 7,979,329 | B2 * | 7/2011 | Cao et al. ........................ | 705/34 |
| 8,024,225 | B1 * | 9/2011 | Sirota et al. .................. | 705/26.1 |
| 2004/0117311 | A1 * | 6/2004 | Agarwal et al. ................. | 705/52 |
| 2008/0114690 | A1 * | 5/2008 | Skidmore et al. ............... | 705/52 |

* cited by examiner

*Primary Examiner* — Jeffery Williams
*Assistant Examiner* — Henry Tsang

(57) ABSTRACT

The invention refers to a method of correlating a plurality of service instances by a service composition entity, wherein the services are performed by one or a plurality of servers of a telecommunications network. Thereto, the service composition entity performs the steps of invoking a composite service instance corresponding to the service request, and generating a composite service identifier identifying this composite service instance, contacting the one or a plurality of application servers for invoking the plurality of component service instances, wherein the plurality of component service instances are associated to the composite service instance, and sending a first service report comprising an information about the composite service instance to a service supervision system, wherein this information enables the service supervision system to identify reports about the component service instances as being associated to the composite service instance. The invention further proposes a service composition entity for correlating the plurality of service instances, and a service supervision system for monitoring, supervising or controlling the composite service instance.

12 Claims, 2 Drawing Sheets

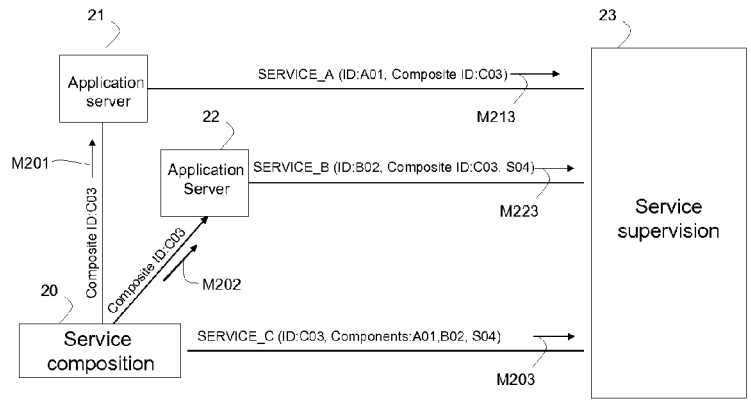
Fig. 2a
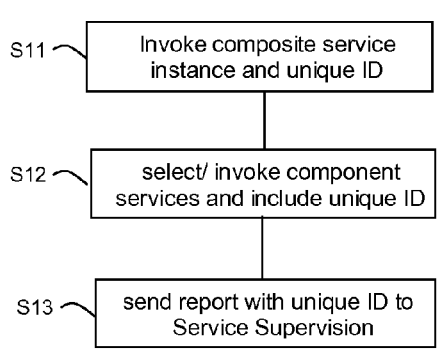
Fig. 2b
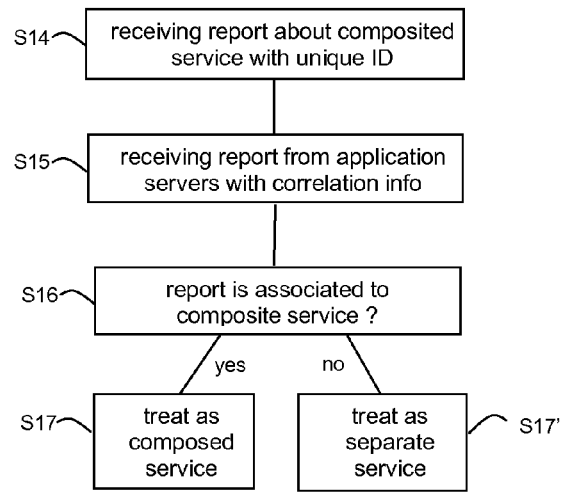
Fig. 2c
```
Country:  49          Germany
Network:  172         Vodafone
Node ID:  1234
Date:     2008-03-01
Number:   311253
```
Fig. 3

COMPOSITE SERVICES PROVISION WITHIN A TELECOMMUNICATIONS NETWORK

FIELD OF THE INVENTION

The present invention relates to service composition within telecommunications networks.

BACKGROUND OF THE INVENTION

Service composition refers to a technology, where end user services to be provided to user terminals, e.g. to personal computers, laptop computers, or mobile phones of a telecommunications network, are dynamically built by combining constituent services. The selection of the constituent services as components of the composite service may be performed just in time at user request. The needed constituent services are described in terms of required generic properties. Any service that provides the needed properties can be used as part of the composite service. Rather than fixed binding of a particular service any suitable service within a pool of available services can be selected. The pool of available constituent services can change dynamically by adding new services or by removing them. A composite service can therefore consist of different constituent services at each invocation. Thus, the set of component services that are actually included into a composite service may not be static, but depending on runtime conditions. The constituent services do not need to be specifically designed for service composition. They can be integrated into a composite service, but they can also work as a single service.

From the end user point of view, a telecommunication network is substantially defined by the services it provides. The network user selects desired services from a portfolio of available services. For billing, a so-called central charging system is provided that is informed by the service providing nodes and applications about user activities. The charging system determines the amount to be charged for the service usage and deducts from the user's account (online charging) or it logs the activity in detail records for later billing (offline charging). The main information used by the charging system is the identification of the user and the details of the provided service. Various protocols exist to transfer this information from the service nodes to the charging system. Examples are for online charging protocols are DIAMETER or RADIUS. The roles in charging of the central charging system and service nodes are well standardized for example in the 32.xxx series of technical specification by 3GPP.

For billing of the end user, the charging system independently evaluates each service provide to the end user terminal. This approach of separate service processing is reasonable as long as the service price does not depend on the other services provided to the user or on the context of a service usage.

In a service environment that is based on service composition, it is usually not transparent to the end user that his activity starts a composite service that triggers the invocation of a number of implicit services. In other words, the end user expects the composite service being treated as one service item. However at the end, such end user will be charged according to all the services as if the were separate services. E.g. a post-paid subscription user would see the component services on his bill without being able connect them to the composite service he has ordered.

SUMMARY OF THE INVENTION

It is an object of the present invention to improve a handling of composite services.

This object is achieved by the independent claims. Advantageous embodiments are described in the dependent claims.

In an embodiment of the invention, a correlation or coordination of a plurality of application services within a telecommunications network, in the following also being referred to as constituent or component services, is disclosed. The component services together form a composite service that is invoked by a service composition function within the network, in order to satisfy a certain service request of a user. In order to uniquely (within a certain time period) identify the corresponding composite service instance, the service composition function creates a composite service identifier being used in further communications that are related to the composite service instance. All identifiers are communicated towards the service supervision function in a way that this function is enabled to identify and correlate all components of a certain composite service instance.

The invention provides a correlation mechanism that allows to uniquely identifying composite services and the correlated component services. This concept allows overcoming existing service identification problems: if for example a composite service would be build only from SIP services, the SIP session ID might be used to correlate such services. However, the same SIP session ID might also be used for services in the same SIP session that are not necessarily part of the composite service. Also services from several SIP sessions might be used within one composite service. A further advantage of the invention is that service composition can be extended beyond IMS/SIP, e.g. utilizing Web services. SIP services, web services any services based on future service technologies can be combined within one composite service.

The service supervision function system can be any monitoring, supervision or controlling function being that takes any actions depending on the execution of services of the application servers and the service composition entity. In an embodiment, such function is a charging function that is part of a central charging system within the telecommunications network. The charging system is responsible for charging the end users of the network according to the provided services within this network. Thereto, the charging system receives service reports from the servers within the network that deliver services to the end user.

Entities in charge of service composition deliver complex services comprising a plurality of component services. Offering composite services towards end users demand a clear pricing scheme. The user should always be able to predict what he can expect to pay for a service usage. In many markets this is even a legal requirement. On the other hand service composition technology implies a dynamic service selection of (already existing) constituent or component services. The price of a composite service however can only be stipulated, if the charging system gets enough knowledge about the correlation of the component services in order to replace or align the total prices of component services. The present invention allows such an alignment of service prices by providing the necessary information about the service execution context to the charging system. This allows the charging system e.g. to charging a different price or taking a decision depending on the service execution context, depending on whether the services have been executed as parts of a particular composite service or as single services. This allows for example to charge for a service, if it is executed without composite service context, and provide the same service for free, if it is part of a composite service (This might be well appreciated, if for example the user is already subscriber for a composite service that he is paying for).

In an embodiment, the supervision function is part of a server that handles the bearer quality or configuration based on reports received from the servers, in order to reach a certain overall quality of service for the component services. The required quality level might depend on whether the service is executed as part of a particular composite service or not. The invention allows providing such information to such server, so that the server can take an appropriate action with regard to bearer configuration.

In an embodiment, the service composition function sends all information needed to identify and correlate the components of a composite service to the service supervision function. This includes sending the unique identifier of the composite service instance and the identifiers of the component service instances. If services included into a composite service change, updates might be sent to the service supervision system. Thereto, the service composition function, e.g. after having identified the component services and the corresponding application server(s) to deliver(s) the component services, contacts these application servers to invoke the corresponding component service instances to be part of the composite service instance. In order to monitor, supervise or control the composite service, service reports are transmitted to the supervision function. Further, the supervision function gets identifiers of the component service instances that identify the corresponding component service instances, and the composite service identifier.

In an embodiment, the distribution of the composite service instance identifier is conveyed to the service supervision function through the application servers. The composition entity sends the identifier of the composite service instances to the application servers. This identifier is added to the reports to the service supervision function.

In an embodiment thereto, the supervision function receives:
- a first service report about an execution of the composite service instance together with the composite service identifier and the component service identifiers from the service composition, and
- a second service report from at least one of said application servers about an execution of the corresponding component service instance together with the corresponding component service identifier. In this embodiment, it is not necessary that the application server itself report about a correlation with the composite service. It is not even necessary that the application server knows about providing a component service being part of the composite services. This embodiment has the advantage that existing application servers can be included into a composite service environment without changing their interfaces or functionality.

In an embodiment, at least one of application servers adds the composite service identifier to a corresponding third service report to be sent to the service supervision function. Thus, the supervision function receives the service report together with the composite service identifier and the component identifier from the application server. In this embodiment, it is not necessary that the service composition function itself reports about the inclusion of that component service into the composite service. This requires that the application server comprises functionality to generate the corresponding report and that the application server is aware about the inclusion of the component service into the composite service.

In an embodiment the above embodiments are combined. Therein, at least one of the application servers, in the following also being referred to as advanced servers, might comprise the functionality to receive the composite service identifier and to provide a composite service report including this composite service identifier, whereas another application server might not comprise that functionality, in the following also being referred to as conventional servers. In advance to invoking the component services, the service composition function detects which of said application servers are advanced servers and which of them are conventional servers; this information might be received from a service database. The service composition function then transmits the composite service identifier to the advanced servers that include this identifier into their reports to the service supervision function. For services related to the conventional servers, the service composition function receives the corresponding service identifiers and transmits these identifiers together with the composite service identifier.

In an embodiment, a service composition server comprises the service composition function and a further function to report service usage. This function reports composite services instances to the service supervision function. The composition server might be regarded as an application server from the point of view of the service supervision reporting composite services as services. The reporting function of the service composition server also takes the role of a service usage reporting function for a component service that is part of a composite service. This is preferably done for the case that the application server of the component service does not have an own interface for reporting towards the service supervision system, and thus is not able to send any service report. Thereto, the service composition server receives information about the component service execution from said application server, and sends a corresponding service report comprising the corresponding component service instance identifier to the service supervision function.

In an embodiment the service composition function invokes a further component service instance or terminates an actual component service instance at one of said application servers, and sending corresponding update information to the service supervision function.

In an embodiment, the service composition function might send additional information, in the following also being referred to as execution hints, to the service supervision system in order to influence the decisions of the service supervision system in a more detailed way. Which hints (if any) are provided is specified e.g. as part of designing a composite service. Such hints can e.g. be specified explicitly (e.g. hard coded) by a designer of the composite service, or it can be designed to be derived implicitly e.g. from a result of previously executed service.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE FIGURES

FIG. 2b shows a flow diagram with exemplary steps performed in a service composition entity according to FIG. 2a, FIG. 2c shows a flow diagram with exemplary steps performed in a service supervision system according to FIG. 2a, and FIG. 3 shows an exemplary structure of an identifier for an instance of a composite service that might be exchanged between nodes of the above figures.

DETAILED DESCRIPTION OF THE INVENTION

Figure 1A:
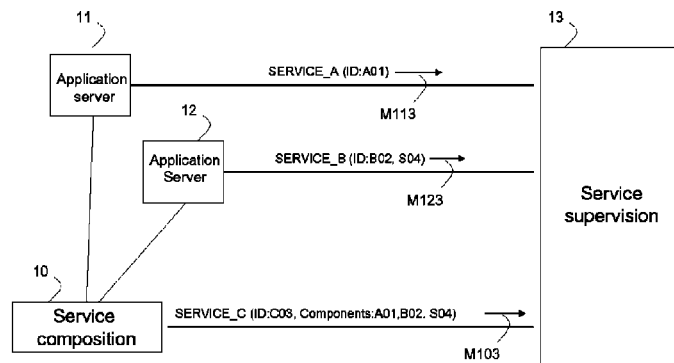
FIG. 1a shows a block diagram with exemplary nodes of a first embodiment for providing and controlling a composite service within a telecommunications network.

FIG. 1a shows a first exemplary arrangement of telecommunications network nodes for coordinating or correlating a plurality of service instances to be provided to terminals of the network. FIG. 1a thereto shows a service composition node 10, a first application server 11, a second composition server 12 and a service supervision (or coordination) system 13. FIG. 1a further shows a set of exemplary service reports M103, M113 and M123 being generated for supervising or coordinating different services generated by the application servers 11 and 12 and/or the service composition entity 10. A first service report M113 is sent from the first application server 11, a second report M123 is sent from the second application server 12, and a third report M103 is sent from the service composition node to the service supervision system 13.

The application servers 11 and 12 can be any nodes of the telecommunications network that deliver services with regard to the end users or user terminals respectively. The service composition entity 10 can be regarded as an application server that provides a service by combining other services. These services—forming a composite service—might be own services provided by the service composition entity 10 itself or it could be services provided by other application servers. The service supervision system can be any system that takes further actions depending on the execution of services of the application servers 11 and 12 and the service composition entity, such as a central charging system being responsible for charging the end users according to the provided services, or a Quality of Service—QoS—server that handles the bearer quality of service settings based on reports received from the servers.

Referring to FIG. 1a, a user terminal (not shown here) might contact the service composition node or entity 10 in order to invoke a certain service. In this example, the service composition entity 10 in response invokes a composite service, by way of example a service named Service C that is associated by way of example to a user session named S04. The service composition entity 10 generates a unique identifier—ID—, by way example a first identifier named C03, for this instance of Service C. As result of a service selection process, the composite service C invokes an instance of service A, e.g. named A01, on the first application server 11 and an instance of service B, e.g. named B02, on the second application server 12. In this example, service B might belong to the same user session, while service A might be used outside this session. The composition entity 10 reports its own instance's ID C03, the session ID S04 and the IDs A01 and B02 of the composite service instances to the service supervision system 13. In this example, the application servers 11 and 12 each report the service invocation to the service supervision system 13 without any special indication of the service composition, in other words, the service supervision system 13 will not be able to indentify the composite service solely from the reports M113 and 123

While the service supervision system 13 receives separate and independent reports M112 and M123 from the application servers 11 and 12, the third report M103 from the service composition entity comprises binding or correlation information to be able to identify the services A and B as part of composite service C. The information about the service execution context can be used in the logic of the service supervision system 13. If the service supervision system 13 is for example a central charging system, the correlation information might perform a price determination being specific for composite services.

Figure 1B:
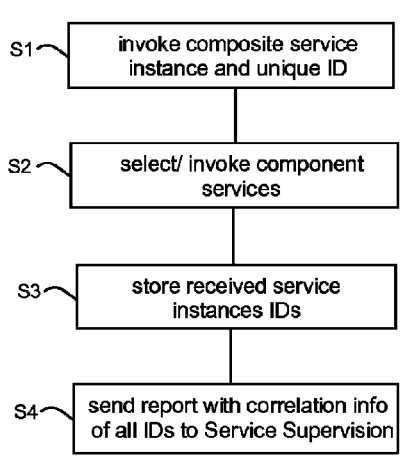
FIG. 1b shows a flow diagram with exemplary steps performed in a service composition entity for controlling or coordinating the composite service according to FIG. 1a, FIG. 1c shows a flow diagram with exemplary steps performed in a service supervision system for monitoring or supervising the composite service according to FIG. 1a, FIG. 2a shows a block diagram with exemplary nodes of a second embodiment for providing and controlling composite services within a telecommunications network.

Referring to FIG. 1b, a flow chart with regard to controlling or coordinating a composition of services within the composition entity 10 is described, comprising the following exemplary steps of activities:

in a first step S1 invoking a composite service instance and generating an identifier (C03) for uniquely identifying this composite service instance;

in a second step S2 selecting and invoking the component services by contacting appropriate application servers 11 and 12;

in a third step S3 storing the service instance ID (A01 and B02) of the components as received from the application servers 11 and 12 within the service invocation process; and in a fourth step S4 sending a report to the service supervision system including all previously generated and stored IDs (A01, B02 C03 and S04).

If new services are added to the composition, the storage of service instance IDs and the sending of reports to the service supervision system 13 might be repeated accordingly.

Further, if the composite service instance is related to a session ID (e.g. Session Initiation Protocol—SIP—session ID), this ID might be stored together with the ID of the composite service, to be additionally reported to the service supervision system 13 in step 4.

Figure 1C:
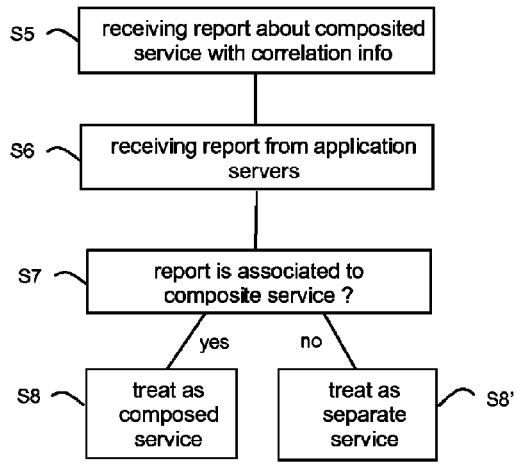

Referring to FIG. 1c, a flow chart with regard to corresponding activities within the service supervision system 13 is described, comprising the following exemplary steps of activities:

in a fifth step S5 receiving the report from the service composition entity 10 of step 4 (certain decisions might be taken in view of the reported composite service instance);

in a sixth step S6 receiving a report from one of the application servers 11 or 12 about the corresponding application service instance and detecting the associated service instance ID;

in a seventh step S7, looking up reported service composition IDs together with their correlation information, and taking a decision, if the application service instance belongs to the reported composite service or not;

if yes, in an eighth step S8 taking the composite service context into account for further actions (if e.g. the service supervision system 13 is responsible for charging, a special price for the specific composite service might be charged that is different from prices of other services);

if no, in an alternative step S8', treating the application service instance as separate service instance (e.g. performing a default action).

Any different sequence of the above steps might be performed; thus the report (and possibly further update reports) from the composition entity 10 could be received after the reports from the application servers 11 and 12.

In an embodiment, the reported ID (of the fifth step above) might already be known in the service supervision system 13. Depending on the further received reports, decisions for the respective service might be re-considered and corrective actions might be taken. According to the example of the service supervision system 13 being responsible for charging, the corrective action might be to grant a refund to the corresponding end user.

The method described above performs coordinating or correlating composite services by directly communicating the service composition details to the service supervision system. Such process will be also referred to as "direct service correlation". In the following example under FIG. 2*a*, FIG. 2*b* and FIG. 2*c*, an alternative correlation process and a corresponding arrangement will be described, also being referred to as "indirect service correlation" in order to distinguish both processes.

FIG. 2*a* thereto shows an alternative arrangement of telecommunications network nodes that is structurally similar to the arrangement shown under FIG. 1*a*, but wherein the nodes exchange (at least partly) different messages and thus comprises (at least partly) different functions. Similarly to the arrangement of FIG. 1*a*, the arrangement shown here comprises a service composition node, in the following also being referred to as second service composition entity 20 and a service supervision system, in the following also being referred to as second service supervision system 23. Further, by way of example, a third application server 21 and a forth composition server 22 are depicted. By way of example, the third application server performs the service named A01, and the fourth application server performs the service named B01. FIG. 2 further shows a set of exemplary messages M201, M202, M203, M213 and M223 being referred to as forth, fifth, sixth, seventh and eight message, generated for supervising or coordinating the different services generated by the application servers 21 and 22 and/or the service composition entity 20.

Similarly to FIG. 1*a*, a composite service C might be invoked by a user activity belonging to a certain user session, e.g. S04. The second composition entity 20 generates a unique identifier, e.g. C03, identifying this instance of service C. As result of the service selection process, the composite service C invokes component services, here the instance A01 of service A on the third application server 21 and the instance B02 of service B on the fourth application server 22. With the invocation, the second service composition entity 20 sends the fourth message M201 and the fifth message M202 to the application servers 21 and 22 respectively, wherein each of these messages comprises the ID C03 of the composite service instance.

When the application servers 21 and 22 send messages M213 and M223 comprising service usage reports to the second service supervision system 23, they add the ID C03 of the composite service instance to these messages. Further, they might add session ID information. In this example, service B belongs to the same user session S04 while service A is used outside this session, but both are components of the composite service C03. The composition entity might report its own composite service instance ID C03 and the session ID S04 with the eight message M203 to the second service supervision system 23. The second service supervision system 23 now can directly correlate all reported services and associate them with a composite service because all reports comprise the common ID C03 of the composite service instance.

Referring to FIG. 2*b*, a flow chart with regard to controlling or coordinating a composition of services within the second composition entity 20 is described, comprising the following exemplary steps of activities:

in a first step S11 invoking a composite service instance and generating an identifier for uniquely identifying this composite service instance;

in a second step S12 selecting and invoking the component services by contacting appropriate application servers 11 and 12 thereby including the unique composite service instance ID into the invocation messages sent to the corresponding application servers 21 and 22 to be added the to their reports to be sent to the second service supervision system 23;

in a third step S13 storing the service instance ID (A01 and B02) of the components as received from the application servers 11 and 12 within the service invocation process; and in a third step S13 sending a report to the service supervision system 23 including the identifier of the composite service instance; additionally the IDs of user sessions, the composite service belongs to, might be added to the report, if applicable.

The composite service instance ID might also be sent to all additional application servers of services that are started as components of this instance of the composite service. Such application servers will also send this composite service instance ID to the second service supervision system 23 accordingly.

Referring to FIG. 2*c*, a flow chart with regard to corresponding activities within the second service supervision system 13 is described, comprising the following exemplary steps of activities:

in a fourth step S14 receiving the report with the identifier of the composite service instance from the service composition entity 20 and storing the received composite service instance ID (e.g. into a table of stored IDs);

in a fifth step S15 receiving a report from one of the application servers 11 or 12 about the corresponding application service instance together with the associated composite service instance ID;

in a sixth step S16, looking up the reported service composition instances IDs, and taking a decision, whether the application service instance belongs to the reported composite service instance or not;

if yes, in an seventh step S17 taking the composite service context into account for further actions;

if no, in an alternative step S17', treating the application service instance as separate service instance.

The method described under FIG. 2 to transfer the information used for service correlation via the application servers implies that these application servers are able to handle the composite service ID. To avoid excluding servers from being included into a service composition environment, a mixed scenario can be applied where both methods of transferring the correlation information described under FIG. 1 and FIG. 2 respectively (i.e. direct and indirect service correlation) co-exist. Therein, the composition engine sends the composite service ID to application servers that support the reporting of this information to the service supervision system. For the other application servers, the composition entity sends the service IDs of the composite service directly to the service supervision system. The capabilities of an attached application server regarding composite service correlation might be stored in the composition entity 10 or 20 in order to allow the choice of the appropriate correlation method.

The following embodiments can be applied within the direct correlation, the indirect correlation or any correlation mixture. The (first) service composition entity 10 or second service composition entity 20 will thus be referred to as service composition entity 10 or 20, and the (first) service supervision system 13 or the second supervision system 13 will be referred to as service composition entity 10 or 20 in the following.

In an embodiment, the service supervision system 13 or the second service supervision system 23 is a charging system. Therein, the further actions might be determining the charging for the service considering the composition context of the service, in order to provide a selective charging to the user.

In another embodiment, the service supervision system 13 or the second service supervision system 23 is a quality of service handler. By receiving and detecting such composite service ID from a message received from an application server, it is able to apply a specific setting for service quality being appropriate for this particular composite service that might be different from the setting for a single service provision of this application server.

The service composition instance ID as introduced above sets an execution context for a component service to be used in a service supervision system 13 or 23. The resolution of that execution context is the composite service instance itself. This means, that the service supervision system 13 or 23, e.g. a charging system, can consider that a component service is part of a specific composite service but it cannot further distinguish the composite service internal conditions leading to this component service invocation. It can also not base its decisions on the result of a service execution. Execution hints can provide a more detailed context. In the following three examples shall be described in more details.

In an embodiment the service composition entity 10 or 20 might send additional information, in the following also being referred to as execution hints, to the service supervision system 13 or 23 in order to be able to influence the decisions of the service supervision system 13 or 23 in a more detailed way. This information might originate in a skeleton of a composite service. This information can e.g. be specified hard coded by a designer of the composite service.

Alternatively, the execution hints can be a result of a previously executed service. Therein, if at execution of a composite service the service composition entity 10 or 20 detects an execution hint, it is sent to the service supervision system 13 or 23 together with the ID of the component service instance the execution hint belongs to. If at this point, the service supervision system 13 or 23 is anyway contacted in order to report the composite service context as described in the previous chapters, the execution hint can be provided as additional data. By adding these execution hints to the composite service skeleton, a service designer can explicitly influence the resulting activities of the attached service supervision system that receives and evaluates the service usage reports.

In a first exemplary embodiment thereto, an exemplary service is provided wherein a charging based on service result is performed: A composite service provides the positions of defined friends of the user. The positioning service shall be free of charge for all friends e.g. within 5 km distance and a costs of 10 cent for each friend outside this distance. The charging for such a service therefore directly depends on the result of the service. To implement this, the skeleton comprises an evaluation of the return value of each positioning service call. If as result of this evaluation the positioning service shall not be free of charge, a hint is sent to the charging system. The charging system then might reconsider its previous decision to provide this positioning for free and now charges 10 cent.

In a second exemplary embodiment thereto, a service is used for different purposes and shall be charged differently according to the purpose: A composite service provides weather information sending regular SMS messages. Additionally the service sends SMS messages containing special weather warnings (e.g. storm warnings) to the service users. For each regular SMS message, 1 Euro is charged while the special warnings are free of charge. It thus depends on the service internal context whether the SMS message is sent for free or not. This charging scheme can be implemented by setting charging hints at the invocation of the free SMS service. When detecting this hint at service execution, the composition entity informs the charging system about such hint. The charging system takes this information into account by accordingly removing all charges from this SMS service.

In a third exemplary embodiment thereto, a streaming quality shall be provided depending on requirements within the context of delivering a composite service: A service provides a multimedia stream, e.g. Music or Video, to a user terminal. A composite service utilizes this streaming service in two different ways. It might stream a low quality sample or it might stream the full high quality content. The bit rate for these kinds of streaming is different. At the invocation of the high quality streaming service, an execution hint is set in the skeleton. This hint is reported together with the IDs of the composite service and the component streaming service to an external Quality of Service—QoS—server that handles the bearer quality of service settings. Based on the received execution hint, this server configures the bearer network in order to guarantee the needed bandwidth.

The execution of the composite service skeleton can consider execution hints in the following way:
- a composite service is invoked and the execution of the respective skeleton starts;
- a component service is selected and invoked. The invoked service returns its service instance ID;
- if an execution hint was specified on this service selection, the service composition entity 10 or 20 sends the execution hint together with the instance ID of the selected component service to the service supervision system 13 or 23;
- a component service terminates and provides a return value; and
- the return value of the service is evaluated; if an execution hint is defined for the termination of this service in combination with the observed return value, the execution hint is sent to the service supervision system together with the instance ID of the terminated service.

The last four steps might be repeated throughout the whole period of execution of the composite service.

Execution hints can be provided at the time of service invocation and optionally separately also at the end of the service execution. It is also possible to send the service result value as execution hint.

In the following an example for an online charging control is described. In this example, the service supervision system 13 or 23 is again considered to be a charging system.

The service composition entity 13 or 23 comprises a charging controller function that implements the interface towards the charging system and sends reports about executed composite services to the charging system. The application servers allocated to the composition entity might not have an own charging controller function with connection to the charging system. This can be the case if application servers are used, that were not (primarily) designed to be used in a classical telecommunication network.

The composition entity invokes the services on the application servers and is informed about the details of service execution. With this information in place, the composition entity can report the service usage to the charging system through its own charging controller function. The composition entity takes the role of the application server towards the charging system. In general this means, that the composition entity separately reports the usage of the composite service and in a separate reporting session also reports the usage of a constituent service that was used as component of the composite service. For the charging system it does not matter, whether an application server reports a service usage directly, or whether the service composition entity takes this role. The composition entity needs to know for which application server it has to take over the charging controller role. This information could be part of a server profile the composition entity checks each time a new service is invoked on an application server. Only if this is stated in the application server profile information the composition entity takes over the charging controller function for the service.

Next to the initial report of a service, the tasks of the composition entity might include the further communication with the charging system. This includes the sending of updates to the charging system for session based charging. Also if for example the charging system orders service termination because of low user account balance the composition entity implements this decision and instructs the application server to terminate the service.

In this example, one of the application servers, e.g. application server 21 has an own charging controller function with an interface towards the charging system, whereas the other application server, e.g. application server 22 does not comprise this functionality. If the composition entity executes the composite service C it invokes service A on application server 21 and service B on application server 22. The application server 21 reports this service usage to the charging system. The composition entity also reports the usage of the composite service C to the charging system. Additionally the composition entity reports the usage of service B to the charging system.

The activities of the composition entity for taking over the charging controller function role of an allocation server could be:
- receiving the request for a composite service from a user terminal;
- reporting the invocation of the composite service to the charging system;
- selecting a service as component of the composite service;
- invoking the service;
- checking in a profile of the application server, where the selected service is executed; and
- if according to the profile the charging controller role needs to be taken by the composition entity (e.g. the profile comprises information about insufficient charging controller capabilities of the application server), reporting the invocation of the service to the charging system; otherwise (e.g. no information available) the charging the composition entity assumes that the application server handles charging itself.

The last four steps might be repeated for each additional service that is added to the composite service.

In the following, different embodiments of protocol extensions are explained. In the context of charging, existing protocols for online charging can be extended in order to transport the composition related correlation data. Similar protocol extensions might apply for other use cases:

For supporting the "direct service correlation" method (FIG. 1): Introduction of additional parameters to the online charging protocols, e.g. the so-called DIAMETER Credit Control Application: a parameter for the composite service instance ID and a parameter containing a list of component services instance IDs. Alternatively, a new protocol towards the charging system can be introduced comprising the parameters mentioned above. Such protocol could also be a new application protocol on top of an existing protocol. For example, a new application protocol on top of the DIAMETER base protocol can be introduced next to the DIAMETER Credit Control Application.

For supporting the "indirect service correlation" method (FIG. 2): A new parameter on the online charging protocols (e.g. DIAMETER Credit Control Application) and new parameters on the protocols for service invocation and control might be introduced, wherein this new parameter carries the composite service instance ID.

For an execution of hints, a new parameter might be introduced on the online charging protocols (e.g. DIAMETER Credit Control Application). This parameter carries the generic charging hint information. It can be regarded as being generic in a sense that no specific data format or value range is pre-defined, but it depends on what the composite service designer uses in the skeleton.

For an offline charging, the composition entity might generate a so-called Charge Data Record (CDR) that is transferred to the charging and billing system. This record might contain the ID of the composite service instance and the IDs of all involved services and sessions. The charging system, at the time of processing the record, is then able to correlate the composite service to its components and adapt the resulting charging accordingly.

As discussed above, the service composition entity 10 or 20 generates a unique identifier for each composite service instance. Building blocks of the composition ID are e.g.:
- Country Code,
- Network Identifier/Operator Identifier,
- Node Identifier,
- Service Identifier,
- Date and Time of service invocation, and
- Consecutive Numbers.

FIG. 3 shows an example of a structure for such ID. In this example, the generated parameters consist of constant parts (country, network and node ID) identifying the generating composition entity node in a globally unique way. The Date and Number are dynamically generated. In order to uniquely identify a service by the ID, the value range of the number should be big enough in order to be able to provide a new number for each invoked service within a certain time period, e.g. within one day.

Within the scope of service composition, this invention allows to perform highly flexible actions depending on the specific service context. Depending on the kind of service supervision, a variety of flexible action might be performed: E.g. in a charging environment, the invention allows performing a special charging depending on whether a service is part of such composite service or not. In a network resources controlling environment, the invention allows flexibly setting resource or quality parameters depending on the service context, in order to steer and control the network resources assigned to a service. Further it is possible to perform specific service usage statistics for composite services.

The invention claimed is:

1. A method in a service composition hardware server of correlating a plurality of component service instances performed by one or more application servers, the method comprising:

receiving, by the service composition hardware server, a service request for a certain service, invoking, by the service composition hardware server, a composite service instance corresponding to the service request, and generating a composite service identifier identifying the composite service instance, contacting, by the service composition hardware server, the one or more application servers for invoking the plurality of component service instances, wherein the plurality of component service instances are associated with the composite service instance, receiving, by the service composition hardware server, from one of the one or more application servers, a component service identifier that identifies a corresponding component service instance, inserting, by the service composition hardware server, the component service identifier into the first service report, sending, by the service composition hardware server, a first service report comprising information about the composite service instance and the composite service identifier to a service supervision system, wherein the information enables the service supervision system to identify service reports about the plurality of component service instances as being associated with the composite service instance, and providing, by the service composition hardware server, an instruction to terminate at least one of the plurality of component service instances and corresponding update information.

2. The method of claim 1, further comprising:

detecting, by the service composition hardware server, that one of the one or more application servers is not able to communicate about a corresponding component service execution with the service supervision system, receiving, by the service composition hardware server, information about the corresponding component service execution from the one or more application servers, and sending, by the service composition hardware server, a third service report to the service supervision system, wherein the third service report comprises a corresponding component service identifier.

3. The method of claim 1, further comprising invoking, by the service composition hardware server, a further component service instance and providing corresponding update information.

4. The method of claim 1, further comprising sending, by the service composition hardware server, information based on a return value of at least one of the plurality of component service instances to the service supervision system.

5. A method, in a service supervision system hardware server, of supervising a composite service instance being invoked and controlled by a service composition entity, wherein the composite service instance is composed of a plurality of component service instances being performed by one or more application servers, the method comprising:

receiving, by the service supervision system hardware server, from the service composition entity a first service report comprising information about the composite service instance and a composite service identifier identifying the composite service instance, detecting, by the service supervision system hardware server, from the first service report, the composite service identifier together with at least one of the component service identifiers, wherein the at least one component service identifier was inserted by the service composition hardware server after it received the at least one component service identifier from one of the one or more application servers, receiving, by the service supervision system hardware server, from one of the application servers, at least one second service reports, each second service report comprising information about the plurality of component service instances and the composite service identifier identifying the composite service instance and component service identifiers identifying each one of the plurality of component service instances together with information about a correlation of the composite service identifier and the component service identifiers, to identify at least one of the second service reports about the plurality of component service instances as being associated with the composite service instance, and providing, by the service supervision system hardware server, an instruction to terminate at least one of the plurality of component service instances and corresponding update information.

6. The method of claim 5, further comprising:

receiving, by the service supervision system hardware server, at least one of the second service reports, from one of the application servers, the at least one of the second service reports comprising the component service identifier identifying the corresponding component service instance.

7. A service composition hardware server for coordinating a plurality of component service instances being invoked at one or more application servers, the service composition server comprising a non-transitory computer-readable medium encoded with instructions, which, when executed by one or more processors performs the steps comprising:

receiving a service request for a certain service, invoking a composite service instance corresponding to the service request, and generate a composite service identifier identifying the composite service instance, contacting the one or more application servers for invoking the plurality of component service instances, wherein the plurality of component service instances are associated with the composite service instance, receiving, from one of the one or more application servers, a component service identifier that identifies a corresponding component service instance, inserting the component service identifier into the first service report, sending a first service report comprising information about the composite service instance and the composite service identifier to a service supervision system, wherein the information enables the service supervision system to identify service reports about the plurality of component service instances as being associated with the composite service instance, and providing an instruction to terminate at least one of the plurality of component service instances and corresponding update information.

8. A service supervision system hardware server for supervising a composite service instance, the service supervision system hardware server comprising a non-transitory computer-readable medium encoded with instructions, which, when executed by one or more processors performs the steps comprising:

receiving, from a service composition entity, a first service report comprising information about a composite service instance and a composite service identifier identifying the composite service instance, wherein the composite service instance is composed of a plurality of component service instances being performed by one or more application servers;

detecting, from the first service report, the composite service identifier together with at least one component service identifier, wherein the at least one component service identifier was inserted by a service composition hardware server after it received the at least one component service identifier from one of the one or more application servers, receiving, from the one or more application servers, at least one second service reports, each second service report comprising information about the plurality of component service instances and the composite service identifier identifying the composite service instance and component service identifiers identifying each one of the plurality of component service instances together with information about a correlation of the composite service identifier and the component service identifiers, to identify at least one of the second service reports about the plurality of component service instances as being associated with the composite service instance, and providing an instruction to terminate at least one of the plurality of component service instances and corresponding update information.

9. The service supervision system hardware server of claim 8, wherein a charging the one or more processors further perform:

charging a user according to provided services within a telecommunications network, wherein the user is charged depending on whether at least one of the plurality of component service instances is executed as part of a composite service instance.

10. The service supervision system hardware server of claim 8, wherein the one or more processors further perform:

configuring a bearer quality based on information received with the first service report or the at least one second service reports, in order to provide a certain quality of service for the plurality of component service instances.

11. A computer program product comprising a program code stored in a non-transitory computer readable medium configured to:

receive a service request for a certain service, invoke a composite service instance corresponding to the service request, and generate a composite service identifier identifying the composite service instance, contact one or more application servers for invoking a plurality of component service instances, wherein the plurality of component service instances are associated with the composite service instance, receive, from one of the one or more application servers, a component service identifier that identifies a corresponding component service instance, insert the component service identifier into the first service report, send a first service report comprising information about the composite service instance and the composite service identifier to a service supervision system, wherein the information enables the service supervision system to identify service reports about the plurality of component service instances as being associated with the composite service instance, and provide an instruction to terminate at least one of the plurality of component service instances and corresponding update information.

12. A computer program product comprising a program code stored in a non-transitory computer readable medium configured to:

receive, from a service composition entity, a first service report comprising information about a composite service instance and a composite service identifier identifying the composite service instance, wherein the composite service instance is composed of a plurality of component service instances being performed by one or more application servers;

detect, from the first service report, the composite service identifier together with at least one component service identifier, wherein the at least one component service identifier was inserted by a service composition hardware server after it received the at least one component service identifier from one of the one or more application servers, receive, from the one or more application servers, at least one second service reports, each second service report comprising information about the plurality of component service instances and the composite service identifier identifying the composite service instance and component service identifiers identifying each one of the plurality of component service instances together with information about a correlation of the composite service identifier and the component service identifiers, to identify at least one of the second service reports about the plurality of component service instances as being associated with the composite service instance, and provide an instruction to terminate at least one of the plurality of component service instances and corresponding update information.

\* \* \* \* \*